United States Patent Office 2,879,275
Patented Mar. 24, 1959

2,879,275

1,3-DISUBSTITUTED DERIVATIVES OF 4,5,6,7,10,10-HEXACHLORO-4,7-ENDOMETHYLENE-4,7,8,9-TETRAHYDROPHTHALANE

Hans Feichtinger and Siegfried Püschhof, Duisburg-Beeck, Germany, assignors to Ruhrchemie Aktiengesellschaft, Oberhausen-Holten, Germany, a corporation of Germany No Drawing. Application August 9, 1957
Serial No. 677,235

Claims priority, application Germany August 11, 1956

2 Claims. (Cl. 260—346.2)

This invention relates to and has as its object the production of 1,3-disubstituted derivatives of 4,5,6,7,10,10 - hexachloro - 4,7-endomethylene-4,7,8,9-tetrahydrophthalane which are highly effective insecticides, fungicides and acaricides and which can also be used as intermediate products for further organic synthesis.

The tetrahydrophthalane derivatives in accordance with the invention have the formula:

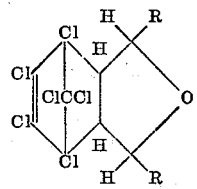

in which R is a fluorine atom or a lower alcoholate or acetoxy radical, as for exmaple, the radicals, F, OCH$_3$, OC$_2$H$_5$, OC$_3$H$_7$, OCH$_2$CH=CH$_2$, OCH$_2$C=CHOCOCH$_3$.

The starting material for the production of the tetrahydrophthalane derivatives in accordance with the invention is 1,3,4,5,6,7,10,10-octachloro-4,7-endomethylene-4,7,8,9-tetrahydrophthalane which is produced in the known manner by chlorinating 4,5,6,7,10,10-hexachloro-4,7-endomethylene-4,7,8,9 - tetrahydrophthalane. The chlorination results in the introduction of two new chlorine atoms in the α and α' position with respect to the oxygen atom of the phthalane ring system. The reactivity of the chlorine atoms in the 1 and 3-positions is substantially greater than that of the other chlorine atoms positioned in the bicycloheptene ring.

The starting material for the process in accordance with the invention may be obtained, for example, by the methods set forth in Dutch Patent 83,632; in British Patent 772,212.

The tetrahydrophthalane derivatives are formed in accordance with the invention by reacting 1,3,4,5,6,7,10,10-octachloro-4,7-endomethylene - 4,7,8,9 - tetrahydrophthalane with a compound of the formula MeR in which Me is a metal of the first group of periodic system, as for example, sodium, potassium or silver and R is fluorine or lower alcoholate radical or acetoxy radical. The reaction very surprisingly results in the substitution of R for the chlorine atoms in the 1 and 3-positions in a smooth reaction without effecting the halogen atoms positioned in the bycycloheptene portion of the molecule. The convertion takes place exclusively at the 1 and 3 carbon atoms so that the substitution only occurs at these points on the molecule even if the reaction is effected in an alkaline medium. The reaction proceeds in accordance with the following reaction scheme:

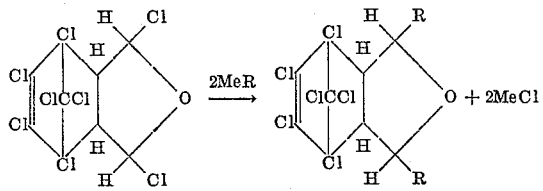

in which Me represents a metal of the first group of the periodic system, as for example, sodium, potassium or silver and R represents a fluorine atom or a lower alcoholate or acetoxy radical as for example, F, OCH$_3$, OC$_2$H$_5$, OC$_3$H$_7$, OCH$_2$CH=CH$_2$, OCH$_2$C=CH, OCOCH$_3$.

The reaction may be effected by contacting the 1,3,4,5,6,7,10,10-octachloro-4,7-endomethylene - 4,7,8,9-tetrahydrophthalane directly with the metal salt or the reaction may be effected in suitable suspending agents or solvents. Suitable solvents include water or lower alcohols while suitable suspending agents include aliphatic, alicyclic or aromatic hydrocarbons or ethers. The reaction proceeds at normal or elevated temperatures and the reaction mixture is processed in the conventional manner and the resulting product is purified by crystallization or distillation which is preferably effected under vacuum.

The compounds obtained in accordance with the invention are crystallized materials or highly viscous oils of the yellowish color which have high insecticidal, fungicidal or acaricidal properties and may also be used as intermediate products for further organic synthesis.

The following examples are given by way of illustration and not limitation.

EXAMPLE 1

8.2 grams of 1,3,4,5,6,7,10,10-octachloro-4,7-endomethylene-4,7,8,9-tetrahydrophthalane were dissolved in 80 cc. of acetonitrile and 40 grams of 28% silver monofluoride were added to the solution. After heating for 12 hours on a water bath the solution was filtered and the acetonitrile was distilled off under vacuum. From the residue which was dissolved in ether and treated with activated charcoal there could be separated 3.7 grams of a compound which contained 5.8% of fluorine. By chromatography at a column of Al$_2$O$_3$ of 30 cm. in length and 20 mm. diameter using petroleum ether as the eluting egent there was obtained 0.8 gram of 1,3-difluoro-4,5,6,7,10,10-hexachloro-4,7-endomethylene-4,7,8,9 - tetrahydrophthalane which had a (corrected) melting point of 181–182° C.

The unpurified reaction product of 1,3,4,5,7,10,10-octachloro-4,7-endomethylene-4,7,8,9 - tetrahydrophthalane and silver monofluoride has a surprisingly high insecticidal efficiency as compared with the starting material as may be seen from the following table. Particularly remarkable is the high intial efficiency of the fluorinated products.

Table

| Insecticide | Time of action | concentration of active substance, γ/cm.$^2$ | Irreversibly damaged animals, percent |
|---|---|---|---|
| Chlordane | 60 | 6.85 | 10 |
| | | 1.37 | 7 |
| | | 0.685 | 3 |
| | 90 | 6.85 | 10 |
| | | 1.37 | 7 |
| | | 0.685 | 4 |
| Aldrin | 60 | 6.85 | 5 |
| | | 1.37 | 5 |
| | | 0.685 | 4 |
| | 90 | 6.85 | 18 |
| | | 1.37 | 17 |
| | | 0.685 | 10 |
| 1,3,4,5,6,7,10,10-octachloro-4,7-methylene-4,7,8,9-tetrahydrophthalane | 60 | 6.85 | 61 |
| | | 1.37 | 48 |
| | | 0.685 | 37 |
| | 90 | 6.85 | 72 |
| | | 1.37 | 67 |
| | | 0.685 | 46 |
| unpurified reaction product of 1,3,4,5,7,10,10-octachloro-4,7-endomethylene-4,7,8,9-tetrahydrophthalane and silver monofluoride | 60 | 6.85 | 100 |
| | | 1.37 | 90 |
| | | 0.685 | 73 |
| | 90 | 6.85 | 100 |
| | | 1.37 | 96 |
| | | 0.685 | 86 |

EXAMPLE 2

4.12 grams of 1,3,4,5,6,7,10,10-octachloro-4,7-endo-methylene-4,7,8,9-tetrahydrophthalane were dissolved in 50 cc. of benzene and heated for 30 hours at 45° C. together with a solution of 0.92 gram of sodium in 50 cc. of methanol. After completion of the reaction the solution was mixed with 100 cc. of water and the benzene layer which separated was evaporated under vacuum after drying with annealed sodium sulfate. 1,3-dimethoxy-4,5,6,7,10,10-hexachloro-4,7 - endomethylene-4,7,8,9-tetrahydrophthalane in a yield of 2,8 grams (69.5% of the theoretically possible amount) was obtained as the residue. The melting point (corrected) of the compound was 167–168° C. after recrystallization from kerosene.

EXAMPLE 3

8.0 grams of KOH were dissolved in 50 cc. of anhydrous ethyl alcohol and 8.2 grams of 1,3,4,5,6,7,10,10-octachloro-4,7-endomethylene-4,7,8,9 - tetrahydrophthalane were added to this solution in portions. Each addition was accompanied by an instantaneous vigorous reaction. Upon completion of the reaction the product was poured into water, extracted with ether and, after separation of the ether layer, concentrated by evaporation under vacuum. This resulted in 4.1 grams of 1,3-diethoxy-4,5,6,7,10,10-hexachloro-4,7-endomethylene - 4,7,8,9-tetrahydrophthalane (48% of the theoretically possible quantity). When recrystallized from methanol, the compound first melted at 67° C., but then solidified and thereafter had a melting point (corr.) of 77° C.

EXAMPLE 4

8.2 grams of 1,3,4,5,6,7,10,10-octachloro-4,7-endo-methylene-4,7,8,9-tetrahydrophthalane were dissolved in 50 cc. of benzene and slowly added dropwise to a solution of 2 grams of sodium in 10 cc. of allyl alcohol. After heating for 8 hours at 50° C. the reaction solution was treated with 100 cc. of water and the benzene layer was concentrated by evaporation under vacuum after drying with sodium sulfate. The residue of 4 grams (44% of the theory) had a boiling point (corr.) of 130–145° C. at 0.05 mm. Hg and a refractive index, $n_D^{20}$, of 1.5360, which corresponded to 1,3-diallyloxy-4,5,6,7,10,10-hexachloro-4,7 - endomethylene - 4,7,8,9-tetrahydrophthalane.

EXAMPLE 5

2.0 grams of 1,3,4,5,6,7,10,10-octachloro-4,7-endo-methylene-4,7,8,9-tetrahydrophthalane and 2.0 grams of silver acetate were dissolved in 500 cc. of 80 wt. percent aqueous acetic acid and heated for 16 hours with refluxing. Thereafter, the solution was filtered off from the precipitated silver chloride and concentrated by evaporation under vacuum. The residue was dissolved in ether, treated with activated charcoal and again evaporated to dryness. This resulted in 1.2 grams (66% of the theory) of 1,3-diacetoxy-4,5,6,7,10,10-hexachloro-4,7-endomethylene-4,7,8,9-tetrahydrophthalane which had a melting point (corrected) of 267° C. after recrystallization from gasoline.

EXAMPLE 6

8.2 grams (0.02 mol) of 1,3,4,5,6,7,10,10-octachloro-4,7-methylene-4,7,8,9-tetrahydrophthalane were dissolved in 50 cc. of benzene and to this solution there was slowly added in drops a solution of 2 grams of sodium in 25 cc. of propargyl alcohol and 30 cc. of benzene at 20–30° C. After further heating for 8 hours at 50° C. the reaction product was treated with 50 cc. of water and the benzene layer was concentrated by evaporation under vacuum after drying with sodium sulfate. The residue obtained was distilled under a vacuum of 0.2 mm. Hg and the resulting distillate which had a boiling point of 160–180° C. was recrystallized from petroleum ether after crystallization. The 1,3-dipropargyloxy-4,5,6,7,10,10-hexachloro-4,7-methylene - 4,7,8,9 - tetrahydrophthalane obtained in a yield of 5 grams (55.4% of the theory) had a melting point of 71° C.

We claim:
1. A tetrahydrophthalane derivative having the formula:

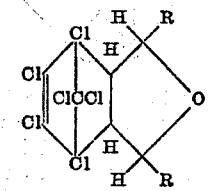

in which the R's are the same member selected from the group consisting of $OCH_3$, $OC_2H_5$, $OC_3H_7$, $OCH_2CH=CH_2$, $OCH_2C\equiv CH$ and $OCOCH_3$ radicals.

2. Process for the production of 1,3-disubstituted derivatives of 4,5,6,7,10,10-hexachloro-4,7-endomethylene-4,7,8,9-tetrahydrophthalane which comprises reacting 1,3,4,5,6,7,10,10-octachloro-4,7-endomethylene - 4,7,8,9-tetrahydrophthalane with a compound having the formula MeR in which Me is a member selected from the group consisting of potassium, sodium and silver, and R is a member selected from the group consisting of $OCH_3$, $OC_2H_5$, $OC_3H_7$, $OCH_2CH=CH_2$, $OCH_2C\equiv CH$ and $OCOCH_3$ radicals and recovering the 1,3-disubstituted derivative formed.

No references cited.